United States Patent
Eick et al.

(10) Patent No.: US 11,543,551 B2
(45) Date of Patent: *Jan. 3, 2023

(54) 3D SEISMIC ACQUISITION

(71) Applicant: SHEARWATER GEOSERVICES SOFTWARE INC., Houston, TX (US)

(72) Inventors: Peter M. Eick, Houston, TX (US); Joel D. Brewer, Sealy, TX (US); Charles Clinton Mosher, Houston, TX (US)

(73) Assignee: SHEARWATER GEOSERVICES SOFTWARE INC., Houston, TX (US)

( * ) Notice: Subject to any disclaimer, the term of this patent is extended or adjusted under 35 U.S.C. 154(b) by 135 days.

This patent is subject to a terminal disclaimer.

(21) Appl. No.: 16/298,397

(22) Filed: Mar. 11, 2019

(65) Prior Publication Data

US 2019/0310387 A1 Oct. 10, 2019

Related U.S. Application Data

(63) Continuation of application No. 15/276,015, filed on Sep. 26, 2016, now Pat. No. 10,267,939.

(60) Provisional application No. 62/233,661, filed on Sep. 28, 2015.

(51) Int. Cl.
   *G01V 1/38* (2006.01)
   *G01V 1/36* (2006.01)
   *G01V 1/30* (2006.01)
   *G01V 1/34* (2006.01)

(52) U.S. Cl.
   CPC ............ *G01V 1/3808* (2013.01); *G01V 1/302* (2013.01); *G01V 1/36* (2013.01); *G01V 1/345* (2013.01); *G01V 2210/45* (2013.01); *G01V 2210/51* (2013.01); *G01V 2210/57* (2013.01); *G01V 2210/74* (2013.01)

(58) Field of Classification Search
   CPC ........ G01V 1/3808; G01V 1/36; G01V 1/302; G01V 1/345; G01V 2210/74; G01V 2210/51; G01V 2210/57; G01V 2210/45

See application file for complete search history.

(56) References Cited

U.S. PATENT DOCUMENTS

| 2,906,363 | A | 9/1959 | Clay |
| 3,747,055 | A | 7/1973 | Greene |
| 3,747,056 | A | 7/1973 | Treybig et al. |
| 3,840,845 | A | 10/1974 | Brown |
| 3,877,033 | A | 4/1975 | Unz |
| 4,330,873 | A | 5/1982 | Peterson |
| 4,404,664 | A | 9/1983 | Zachariadis |
| 4,509,151 | A | 4/1985 | Anderson |
| 4,553,221 | A | 11/1985 | Hyatt |

(Continued)

FOREIGN PATENT DOCUMENTS

| CN | 103954993 | 7/2014 |
| EP | 2103959 | 9/2009 |

(Continued)

OTHER PUBLICATIONS

US 8,737,164 B2, 05/2014, Hillesund et al. (withdrawn)

(Continued)

*Primary Examiner* — Ian J Lobo
(74) *Attorney, Agent, or Firm* — Polsinelli PC (57) ABSTRACT

Disclosed are methods of marine 3D seismic data acquisition that do not require compensation for winds and currents.

12 Claims, 5 Drawing Sheets

Diagram of a marine towed streamer seismic survey with the raypaths that result from a single shot by an airgun into a streamer containing 5 hydrophones.
--- = raypaths to first reflector; --- = raypaths to second reflector;

(56) References Cited

U.S. PATENT DOCUMENTS

| | | | |
|---|---|---|---|
| 4,559,605 A | 12/1985 | Norsworthy | |
| 4,596,005 A | 6/1986 | Frasier | |
| 4,597,066 A | 6/1986 | Frasier | |
| 4,721,180 A | 1/1988 | Haughland | |
| 4,852,004 A | 7/1989 | Manin | |
| 4,958,331 A | 9/1990 | Wardle | |
| 4,967,400 A | 10/1990 | Woods | |
| 4,992,990 A | 2/1991 | Langeland et al. | |
| 5,079,703 A * | 1/1992 | Mosher | G01V 1/301 345/427 |
| 5,092,423 A | 3/1992 | Petermann | |
| 5,148,406 A | 9/1992 | Brink et al. | |
| 5,168,472 A | 12/1992 | Lockwood | |
| 5,353,223 A | 10/1994 | Norton | |
| 5,469,404 A | 11/1995 | Barber et al. | |
| 5,487,052 A | 1/1996 | Cordsen | |
| 5,517,463 A | 5/1996 | Hornbostel | |
| 5,724,306 A | 3/1998 | Barr | |
| 5,774,417 A | 6/1998 | Corrigan et al. | |
| 5,787,051 A | 7/1998 | Goodway | |
| 5,835,450 A | 11/1998 | Russell | |
| 5,973,995 A | 10/1999 | Walker | |
| 6,009,042 A | 12/1999 | Workman et al. | |
| 6,493,636 B1 | 12/2002 | Dekok | |
| 6,509,871 B2 | 1/2003 | Bevington | |
| 6,590,831 B1 | 7/2003 | Bennett et al. | |
| 6,691,038 B2 | 2/2004 | Zajac | |
| 6,876,599 B1 | 4/2005 | Combee | |
| 7,167,412 B2 | 1/2007 | Tenghamn | |
| 7,234,407 B1 | 6/2007 | Levine et al. | |
| 7,336,560 B2 * | 2/2008 | Rekdal | G01V 1/3808 367/15 |
| 7,359,283 B2 | 4/2008 | Vaage et al. | |
| 7,408,836 B2 | 8/2008 | Muyzert | |
| 7,451,717 B1 | 11/2008 | Levine et al. | |
| 7,488,737 B2 | 3/2009 | Mizuta et al. | |
| 7,499,374 B2 | 3/2009 | Ferber | |
| 7,499,737 B2 | 3/2009 | Mizuta et al. | |
| 7,515,505 B2 | 4/2009 | Krohn et al. | |
| 7,545,703 B2 | 6/2009 | Lunde et al. | |
| 7,646,671 B2 | 1/2010 | Pan | |
| 7,993,164 B2 | 8/2011 | Chatterjee et al. | |
| 8,509,027 B2 | 8/2013 | Strobbia et al. | |
| 8,559,270 B2 | 10/2013 | Abma | |
| 8,619,497 B1 | 12/2013 | Sallas et al. | |
| 8,681,581 B2 * | 3/2014 | Moldoveanu | G01V 1/3808 367/15 |
| 8,711,654 B2 * | 4/2014 | Moldoveanu | G01V 1/003 367/15 |
| 8,897,094 B2 * | 11/2014 | Eick | G01V 1/3826 367/17 |
| 9,103,943 B2 * | 8/2015 | Cowlard | G01V 1/3808 |
| 9,110,177 B1 | 8/2015 | Opfer | |
| 9,291,728 B2 | 3/2016 | Eick et al. | |
| 9,529,102 B2 | 12/2016 | Eick et al. | |
| 9,632,193 B2 | 4/2017 | Li et al. | |
| 9,690,003 B2 | 6/2017 | Sallas | |
| 9,823,372 B2 | 11/2017 | Eick et al. | |
| 9,846,248 B2 | 12/2017 | Eick et al. | |
| 10,267,939 B2 | 4/2019 | Eick et al. | |
| 10,514,474 B2 | 12/2019 | Eick et al. | |
| 10,605,941 B2 | 3/2020 | Li et al. | |
| 10,809,402 B2 | 10/2020 | Li et al. | |
| 10,823,867 B2 | 11/2020 | Eick et al. | |
| 10,989,826 B2 | 4/2021 | Eick et al. | |
| 11,035,968 B2 | 6/2021 | Li et al. | |
| 2004/0172199 A1 | 9/2004 | Chavarria et al. | |
| 2005/0088914 A1 | 4/2005 | Ren et al. | |
| 2006/0164916 A1 | 7/2006 | Krohn et al. | |
| 2006/0268662 A1 | 11/2006 | Rekdal et al. | |
| 2007/0013546 A1 | 1/2007 | McConnell et al. | |
| 2007/0025182 A1 | 2/2007 | Robertsson | |
| 2007/0027656 A1 | 2/2007 | Baraniuk | |
| 2007/0276660 A1 | 11/2007 | Pinto | |
| 2008/0008037 A1 | 1/2008 | Welker | |
| 2008/0049551 A1 | 2/2008 | Muyzert et al. | |
| 2008/0080309 A1 | 4/2008 | Elkington et al. | |
| 2008/0089174 A1 | 4/2008 | Sollner et al. | |
| 2008/0144434 A1 | 6/2008 | Hegna et al. | |
| 2008/0151688 A1 | 6/2008 | Goujon | |
| 2008/0205193 A1 | 8/2008 | Krohn et al. | |
| 2008/0225642 A1 | 9/2008 | Moore | |
| 2008/0285380 A1 | 11/2008 | Rouquette | |
| 2009/0006053 A1 | 1/2009 | Carazzone et al. | |
| 2009/0010101 A1 | 1/2009 | Lunde | |
| 2009/0067285 A1 | 3/2009 | Robertson | |
| 2009/0073805 A1 | 3/2009 | Tulett et al. | |
| 2009/0000200 A1 | 4/2009 | Teigen | |
| 2009/0122641 A1 | 5/2009 | Hillesund | |
| 2009/0141587 A1 | 6/2009 | Welker et al. | |
| 2009/0213693 A1 | 8/2009 | Du et al. | |
| 2009/0231956 A1 | 9/2009 | Schonewille | |
| 2009/0251992 A1 | 10/2009 | Borselen | |
| 2009/0262601 A1 | 10/2009 | Hillesund | |
| 2009/0279384 A1 | 11/2009 | Pavel | |
| 2009/0279386 A1 | 11/2009 | Monk | |
| 2009/0323472 A1 | 12/2009 | Howe | |
| 2010/0002536 A1 | 1/2010 | Brewer | |
| 2010/0103772 A1 | 4/2010 | Eick | |
| 2010/0128563 A1 | 5/2010 | Strobbia et al. | |
| 2010/0195434 A1 | 8/2010 | Menger et al. | |
| 2010/0208554 A1 * | 8/2010 | Chiu | G01V 1/362 367/153 |
| 2010/0211321 A1 | 8/2010 | Ozdemir | |
| 2010/0265799 A1 | 10/2010 | Cebver et al. | |
| 2010/0299070 A1 | 11/2010 | Abma | |
| 2011/0019502 A1 | 1/2011 | Eick | |
| 2011/0038227 A1 | 2/2011 | Kostov et al. | |
| 2011/0128818 A1 | 6/2011 | Eick et al. | |
| 2011/0156494 A1 | 6/2011 | Mashinsky | |
| 2011/0170796 A1 | 7/2011 | Qian et al. | |
| 2011/0218737 A1 | 9/2011 | Gulati | |
| 2011/0286302 A1 | 11/2011 | Welker et al. | |
| 2011/0305106 A1 | 12/2011 | Eick et al. | |
| 2011/0305107 A1 | 12/2011 | Eick | |
| 2011/0305113 A1 | 12/2011 | Eick | |
| 2011/0307438 A1 | 12/2011 | Martinez | |
| 2011/0317517 A1 | 12/2011 | Borresen et al. | |
| 2012/0002503 A1 | 1/2012 | Janiszewski et al. | |
| 2012/0014212 A1 * | 1/2012 | Eick | G01V 1/3808 367/23 |
| 2012/0051181 A1 | 3/2012 | Eick et al. | |
| 2012/0082004 A1 | 4/2012 | Boufounos | |
| 2012/0113745 A1 | 5/2012 | Eick et al. | |
| 2012/0143604 A1 | 6/2012 | Singh | |
| 2012/0281499 A1 | 11/2012 | Eick et al. | |
| 2012/0294116 A1 | 11/2012 | Kamata | |
| 2012/0300585 A1 * | 11/2012 | Cao | G01V 1/345 367/73 |
| 2013/0135966 A1 | 5/2013 | Rommel et al. | |
| 2013/0250720 A1 * | 9/2013 | Monk | G01V 1/005 367/20 |
| 2013/0294194 A1 | 11/2013 | Pritchard | |
| 2014/0133271 A1 | 5/2014 | Sallas | |
| 2014/0146638 A1 | 5/2014 | Renaud | |
| 2014/0211590 A1 | 7/2014 | Sallas | |
| 2014/0278289 A1 | 9/2014 | Etgen | |
| 2014/0303898 A1 | 10/2014 | Poole | |
| 2014/0362663 A1 | 12/2014 | Jones et al. | |
| 2015/0016218 A1 | 1/2015 | Welker et al. | |
| 2015/0078128 A1 | 3/2015 | Eick et al. | |
| 2015/0124560 A1 * | 5/2015 | Li | G01V 1/36 367/14 |
| 2015/0272506 A1 | 10/2015 | Childs | |
| 2015/0348568 A1 | 12/2015 | Li et al. | |
| 2016/0018547 A1 | 1/2016 | Eick | |
| 2016/0327661 A1 * | 11/2016 | Mousa | G01V 1/28 |
| 2016/0341839 A1 | 11/2016 | Kazinnik et al. | |
| 2017/0031045 A1 | 2/2017 | Poole et al. | |
| 2017/0082761 A1 | 3/2017 | Li | |
| 2017/0090053 A1 | 3/2017 | Eick | |
| 2017/0108604 A1 | 4/2017 | Turquais et al. | |
| 2018/0067221 A1 | 3/2018 | Eick | |

(56) References Cited

U.S. PATENT DOCUMENTS

| | | |
|---|---|---|
| 2018/0335536 A1 | 11/2018 | Li |
| 2019/0129050 A1 | 5/2019 | Li |
| 2019/0293813 A1 | 9/2019 | Li et al. |
| 2019/0310387 A1 | 10/2019 | Eick et al. |
| 2020/0104745 A1 | 4/2020 | Li |
| 2020/0225377 A1 | 7/2020 | Li et al. |
| 2021/0033741 A1 | 2/2021 | Li et al. |

FOREIGN PATENT DOCUMENTS

| | | | |
|---|---|---|---|
| EP | 2592439 | 5/2013 | |
| WO | 2005019865 | 3/2005 | |
| WO | 2008073178 | 1/2008 | |
| WO | 20090092025 | 7/2009 | |
| WO | 2010149589 | 12/2010 | |
| WO | 2011156491 | 12/2011 | |
| WO | 20110156494 | 12/2011 | |
| WO | 2012166737 | 12/2012 | |
| WO | WO-2012166737 A2 * | 12/2012 | ............ G01V 1/003 |
| WO | 2013105075 | 7/2013 | |
| WO | 2014057440 | 4/2014 | |
| WO | 2015066481 | 5/2015 | |
| WO | 2016009270 | 1/2016 | |
| WO | 2018085567 | 5/2018 | |

OTHER PUBLICATIONS

Hennenfent, Gilles, et al—Application of stable signal recovery to seismic data interpolation Gilles Hennenfent* and Felix J. Herrmann Earth & Ocean Sciences Dept., University of British Columbia 2006; 4 pgs.

Barzilai, Jonathan, et al—"Two-Point Step Size Gradient Methods", 1988, IMA Journal of Numerical Analysis, vol. 8, pp. 141-148, Oxford University Press; 9 pgs.

Lotter, T., et al—"Noise reduction by maximum a posteriori spectral amplitude estimation with supergaussian speech modeling", International Workshop on Acoustic Echo and Noise Control (IWAENC2003), Kyoto, Japan, Sep. 2003, p. 83-86; 4 pgs.

Buia, M. et al—"Shooting Seismic Surveys in Circles", 2008, Oilfield Review, pp. 18-31; 14 pgs.

Wang, Y., et al—"Recovery of Seismic Wavefields Based on Compressive Sending by an I1-Norm Constrained Trust Region Method and the Piecewise Random Subsampling", 2010, Geophys. J. Int.; 15 pgs.

International Search Report, PCT/US2016/053750 dated Dec. 27, 2016; 1 pg.

Mosher, Charles C., et al—"Non-uniform optimal sampling for simultaneous source survey design", 2014, SEG Technical Program Expanded Abstracts pp. 105-109, XP055539704.

Mosher, Charles—"Increasing the efficiency of seismic data acquisition via compressive sensing", 2014, The Leading Edge, vol. 33, Issue No. 4, XP055539699; 9 pgs.

Mosher, C.C., et al—"Non-uniform Optimal Sampling for Seismic Survey Design", 2012, 74th EAGE Conference & Exhibition Incorporating SPE Europec 2012, XP055378421.

PCT/US11/39640 PCT International Search Report dated Oct. 26, 2011.

Almendros, "Mapping the Sources of the Seismic Wave field at Kilauea Volcano, Hawaii, Using Data Recorded on Multiple Seismic Antennas", Bulletin of the Seismological Society of America, vol. 92, No. 6, pp. 2333-2351, Aug. 2002, 19 pgs.

Cordsen, et al., "Planning Land 3D Seismic Surveys", Geophysical Developments Series No. 9, Society of Exploration Geophysicists (SEG), Jan. 2000, 16 pgs.

Hennenfent, "Simple Denoise: Wavefield Reconstruction Via Jittered Undersampling", 2008, Geophysics, vol. 73, Issue No. 3, pp. V19-V28; 10 pgs.

Hindriks, et al, "Reconstruction of 3D Seismic Signals Irregularly Sampled Along Two Spatial Coordinates", Geophysics, vol. 65, No. 1 (Jan.-Feb. 2000); pp. 253-263; 11 pgs.

Li, et al—"Marine Towed Streamer Data Reconstruction Based on Compressive Sensing", SEG Houston 2013 Annual Meeting, pp. 3597-3602; 6 pgs.

Li, et al, "Improving Streamer Data Sampling and Resolution Via Non-Uniform Optimal Design and Reconstruction", 2017 SEG International Exposition and 87th Annual Meeting; pp. 4241-4245, 5 pgs.

Li, et al—"Interpolated Compressive Sensing for Seismic Data Reconstruction", SEC Las Vegas 2012 Annual Meeting, 6 pgs.

Li, et al—"A Multi-Stage Inversion Method for Simultaneous Source Deblending of Field Data", 2014, SEG Denver 2014 Annual Meeting, pp. 3610-3615; 6 pgs.

Li, et al—"Aspects of Implementing Marine Blended Source Acquisition in the Field", 2017, SEG International Exposition and 87th Annual Meeting, pp. 42-46; 5 pgs.

Martin, et al—"Acqusition of Marine Point Receiver Seismic Data with a Towed Streamer", SEG 2000 Expanded Abstracts (2000); 4 pgs.

Mosher, "Compressive Seismic Imaging", SEG Las Vegas 2012 Annual Meeting, 2012; 5 pgs.

Musser, et al—"Streamer Positioning and Spread Stabilization for 4D Seismic", SEG/New Orleans 2006 Annual Meeting 6-9 (2006); 4 pgs.

Stolt, "Seismic Data Mapping and Reconstruction", Geophysics, vol. 67, No. 3 (May-Jun. 2002); pp. 890-908; 19 pgs.

Zwartjes, "Fourier Reconstruction of Nonuniformly Sampled, Aliased Seismic Data", Geophysics, vol. 72, No. 1 (Jan.-Feb. 2007); pp. V21-V32; 12 pgs.

Zwartjes, "Fourier Reconstruction of Nonuniformly Sampled, Aliased Data", SEG Int'l Exposition and 74th Annual Meeting, Denver, CO, Oct. 10-15, 2004, 4 pgs.

Milton, Andrew, et al—"Reducing acquisition costs with random sampling and multi-dimentional interpolation", 2011, SEG San Antonio 2011 Annual Meeting, pp. 52-56; 5 pgs.

Liu, Bin, et al—"Minimum weighted norm interpolation of seismic records", 2004, Geophysics, vol. 69, Issue No. 6, pp. 1560-1568; 9 pgs.

Moldoveanu, Nick—"Random sampling: a New Strategy for Marine Acquisition", 2010, SEG Expanded Abstracts, Denver, CO 2010 Annual Meeting, 29, pp. 51-55, 5 pgs.

Mosher, C., et al—"An in-situ analysis of 3-D seismic lateral resolution", 1985, SEG Expanded Abstracts 4, pp. 109-111; 3 pgs.

Sacci, Mauricio D.—"A tour of high resolution transforms", 2009, Frontiers & Innovation, CSPG, CSEG, CWLS convention, Calgary, Alberts, Canada, Expanded Abstracts, pp. 665-668; 4 pgs.

Shapiro, Harold, et al—"Alias-free sampling of random noise", 1960, SIAM Journal on Applied Mathematics, vol. 8, Issue No. 2, pp. 225-248; 24 pgs.

International Search Report, PCT/US2017/59760, dated Apr. 13, 2018; 2 pgs.

Baraniuk, Richard—"Compressive Sensing", 2007—Rice University Lecture Notes in IEEE Signal Processing Magazine, vol. 24, Jul. 2007, pp. 1-9; 9 pgs.

Kumar, et al—"Source separation for simultaneous towed-streamer marine acquisition—A compressed sensing approach", Geophysics, vol. 80 No. 6, Nov.-Dec. 2015.

Candes, Emmanuel, et al—"Sparsity and Incoherence in Compressive Sampling", 2006, Applied and Computational Mathematics, Caltech, Pasadena, CA 91125 and Electrical and Computer Engineering, Georgia Tech, Atlanta, GA 90332, Nov. 2006; 20 pgs.

Mosher, Charles C.—"Generalized Windowed Transforms for Seismic Processing and Imaging", 2012 Annual SEG meeting Las Vegas Nevada Nov. 4-9, One Petro, SEG 2012-1196, Published by Society of Exploration Geophysicists; 4 pgs.

Zhang, Hongchao, et al—"A Nonmonotone Line Search Technique and its Application to Unconstrained Optimization", 2004, Society for Industrial and Applied Mathematics, vol. 14, No. 4, 14 pgs.

Li, et al—"Joint Source Deblending and Reconstruction for Seismic Data", SEG Houston 2013 Annual Meeting, 6 pgs.

Wang, et al—"Distributed Reconstruction Via Alternating Direction Method", in Computational 3, 9, 15 and Mathematical Methods in Medicine, vol. 2013, Article ID 418747, Hindawi Publishing Corporation, 2013, 8 pgs.

(56) References Cited

OTHER PUBLICATIONS

Trad, "Interpolation and multiple attenuation with migration operators," Geophysics, 2003, vol. 68(6), pp. 2043-2054; 12 pgs.

Mahdad, et al—"Separation of blended data by iterative estimation and subtraction of blending interference noise," Geophysics, 2011, vol. 76, Issue No. 3, 9 pgs.

Maurer, et al—"Seismic Data Acquisition", Geophysics, 2020, vol. 75, Issue No. 5, 20 pgs.

Hermann, Felix J.—"Randomized sampling and sparsity: Getting more information from fewer samples", 2010, Geophysics, vol. 75, Issue No. 6, p. WB173-WB187; 15 pgs.

Memorandum Opinion and Order—*ConocoPhillips Company* v. *In-Depth Compressive Seismic, Inc.*, Civil action H-18-0803; 49 pgs.

Wang, P., et al—"Model-based Water-layer Demultiple", 2011, SEG San Antonio Annual Meeting; 5 pgs.

Thomsen, Leon—"Weak elastic anisotropy", 1986, Geophysics, vol. 51, No. 10, Society of Exploration Geophysicists, 13 pgs.

Huang, H., et al—"Joint SRME and model-based water-layer demultiple for ocean bottom node", 2016, Retrieved from internet. URL: https:/www.cgg.com/technicalDocuments/cggv_0000026243.pdf; entire document.

Amir, Vicki, et al—"Structural Evolution of the Northern Bonaparte Basin, Northwest Shelf Australia", 2010, Proceedings, Indonesian Petroleum Association Thirty-Fourth Annual Convention & Exhibition, May 2010; 17 pgs.

Dragoset, Bill, et al—"A perspective on 3D surface-related multiple elimination", Geophysics Society of Exploration Geophysicists US 20100901 vol. 75 No. 5.

Ala'I, Riaz, "Shallow water multiple prediction and attenuation, case study on data from the Arabian Gulf", 2002, SEG International Exposition and 72nd Annual Meeting, Salt Lake City, Utah; 4 pgs.

Carlson, David, et al—"Increased resolution and penetration from a towed dual-sensor streamer", 2007, First Break, vol. 25; 7 pgs.

Foster, Douglas J.-et al, "Suppression of multiple reflections using the Radon transform", 1992, Geophysics, vol. 57, No. 3, p. 386-395; 10 pgs.

Jin, Hongzheng, et al—"MWD for shallow water demultiple: a Hibernia case study", 2012, GeoConvention Vision, 5 pgs.

Lin, D., et al—"3D SRME Prediction and Subtraction Practice for Better Imaging", 2005, SEG Houston Annual Meeting; 5 pgs.

Mosher, Charles C., et al—"Compressive Seismic Imaging: Moving from research to production", 2017, SEG International Exposition and 87th Annual Meeting, 5 pgs.

\* cited by examiner

FIG. 2A Narrow Azimuth Towed Streamer

FIG. 2B Multi-Azimuth Towed Streamer

Wide Azimuth Towed Streamer
Seismic receiver vessel repeats 4 parallel tracks to give the effect of a survey with 4 x as many receivers; arrows indicates the direction of each vessel's motion

A Comparison of acquisition geometries (bottom) and azimuth offset distribution plots in rose diagrams (top). The number of traces recorded for each offset-azimuth combination is color-coded in the rose diagrams. Offset corresponds to distance from the center of each circle. Azimuth corresponds to the angle within each circle. Colors range in order from purple and blue for a low number of traces, to green, yellow and red for a high number of traces. From left to right: Traditional marine surveys are acquired by one vessel in one azimuth and produce data with a narrow azimuth-offset distribution. Multiazimuth surveys are acquired by one vessel sailing in multiple directions and have azimuth-offset distributions clustered around the direction of the sail lines. Wide-azimuth surveys are acquired by several vessels, increasing the azimuth range for many offsets. Rich-azimuth surveys use several vessels shooting in several directions, combining the concepts of multiazimuth and wide-azimuth surveys to deliver contributions for most azimuth-offset combinations. The Coil Shooting single-vessel technique delivers a high number of contributions for a complete range of azimuths for all offsets.

FIG. 6

3D SEISMIC ACQUISITION

PRIOR RELATED APPLICATIONS

This application is a continuation application which claims benefit under 35 USC § 120 to U.S. application Ser. No. 15/276,015 filed on Sep. 26, 2016, entitled "3D SEISMIC ACQUISITION," which claims benefit under 35 USC § 119(e) to U.S. Provisional Application Ser. No. 62/233,661 filed Sep. 28, 2015, entitled "3D SEISMIC ACQUISITION," which are both incorporated herein in their entirety.

FEDERALLY SPONSORED RESEARCH STATEMENT

Not applicable.

FIELD OF THE DISCLOSURE

The disclosure generally relates to marine seismic data acquisition.

BACKGROUND OF THE DISCLOSURE

Seismic surveys have become the primary tool of exploration companies in the continental United States, both onshore and offshore. As an example, an onshore seismic survey is conducted by creating a shock wave—a seismic wave—on or near the surface of the ground along a predetermined line, using an energy source. The seismic wave travels into the earth, is reflected by subsurface formations, and returns to the surface where it is recorded by receivers called geophones—similar to microphones. By analyzing the time it takes for the seismic waves to reflect off of subsurface formations and return to the surface, a geophysicist can map subsurface formations and anomalies and predict where oil or gas may be trapped in sufficient quantities for exploration activities.

Until relatively recently, seismic surveys were conducted along a single line on the ground, and their analysis created a two-dimensional picture akin to a slice through the earth beneath that line, showing the subsurface geology along that line. This is referred to as two-dimensional or 2D seismic data.

Currently, almost all oil and gas exploratory wells are preceded by 3D seismic surveys. The basic method of testing is the same as for 2D, but instead of a single line of energy source points and receiver points, the source points and receiver points onshore are commonly laid out in a grid across the property. The resulting recorded reflections received at each receiver point come from all directions, and sophisticated computer programs can analyze this data to create a three-dimensional image of the subsurface.

Conceptually, 3D surveys are acquired by laying out energy source points and receiver points in a grid over the area to be surveyed. The receiver points—to record the reflected vibrations from the source points—are commonly laid down in parallel lines (receiver lines), and the source points are laid out in parallel lines that are typically approximately perpendicular to the receiver lines. Although orthogonal layouts are preferred, non-orthogonal layouts are sometimes used as well. The spacing of the source and receiver points is determined by the design and objectives of the survey. They may be several hundred feet apart, or as close as 15 feet.

Figure 1A:
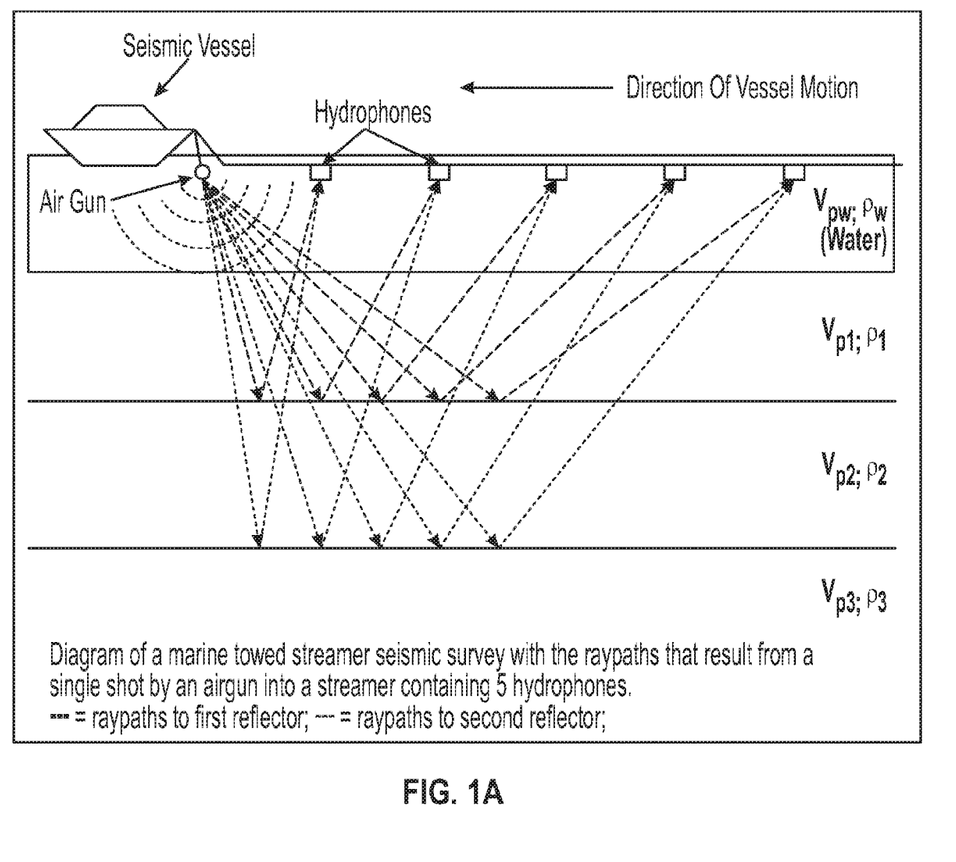
FIG. 1A is a side view of a marine seismic survey vessel and seismic waves.

In marine seismic surveys the survey design is a little different, and instead of a static set of lines, a vessel tows behind it a series of streamers, each having a series of hydrophones along its length. See e.g., FIG. 1A and FIG. 1B. Also towed behind the vessel are one or more seismic sources.

A variety of seismic sources are available for marine applications, including water guns (20-150 Hz), Air Gun (10-150 Hz), Sparkers (50-4000 Hz), Boomers (30-300 Hz), and Chirp Systems (500 Hz-12 kHz, 2-7 kHz, 4-24 kHz, 3.5 kHz, and 200 kHz), but air guns are by far the most common.

The streamers also have depth control "birds" programmed to pivot their wings in response to hydrostatic pressure, thus keeping the streamers at a constant depth, as well as "paravanes" to minimize lateral deviation, described in more detail below. One of the most critical elements of 3D marine seismic systems is positioning. Thus, the vessel also tows one or more tail-buoys that house a differential global positioning receiver used to accurately position each of the hydrophones and additional navigation pods (GPS units and transceivers) are located on the paravanes, gun arrays and pretty much any other location that one can mount them above the surface of the water. Also, noise attenuation algorithms are now available (see e.g., Q-marine single sensor technology) that allow the collection of useful data, even when sailing in curves.

Figures 2A, 2B:
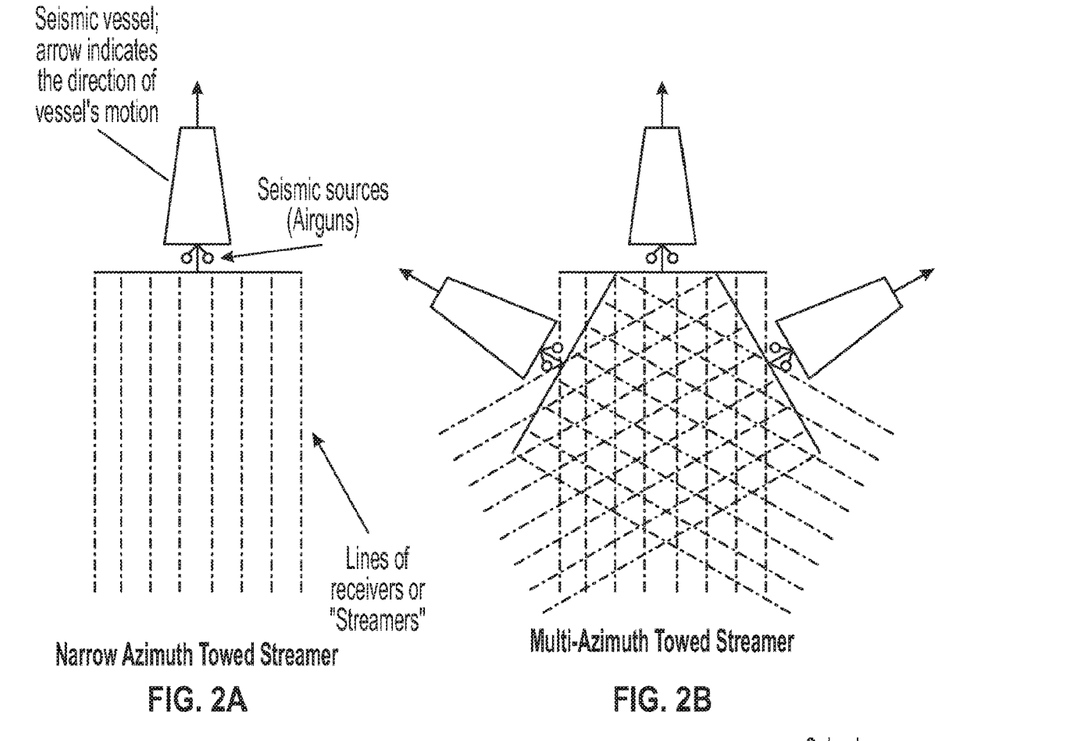
FIG. 2A shows a Narrow Azimuth towed streamers.
FIG. 2B shows a Multi-Azimuth towed streamers.

A seismic vessel with 2 sources and towing a single streamer is known as a Narrow-Azimuth Towed Streamer (aka "NAZ" or "NATS"). By the early 2000s, it was accepted that this type of acquisition was useful for initial exploration, but inadequate for development and production, in which wells had to be accurately positioned. This led to the development of the Multi-Azimuth Towed Streamer or "MAZ," which tried to break the limitations of the linear acquisition pattern of a NATS survey by acquiring a combination of NATS surveys at different azimuths (see FIG. 2). This successfully delivered increased illumination of the subsurface and a better signal to noise ratio.

Figure 3:
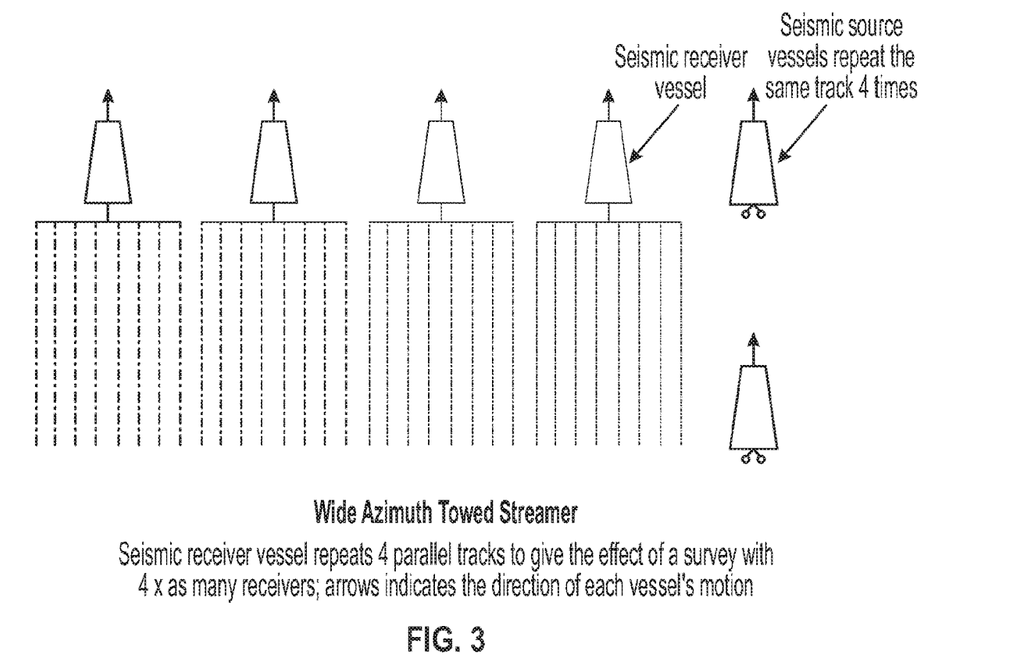
FIG. 3 shows a Wide Azimuth Towed Streamer.

The seismic properties of salt poses an additional problem for marine seismic surveys, as it attenuates seismic waves and its structure contains overhangs that are difficult to image. This led to another variation on the NATS survey type, the wide-azimuth towed streamer (aka "WAZ" or "WATS"), which was first tested on the Mad Dog field in 2004. See FIG. 3. This type of survey involved a single vessel towing a set of 8 streamers and two additional vessels towing seismic sources that were located at the start and end of the last receiver line (see diagram). This configuration was "tiled" 4 times, with the receiver vessel moving further away from the source vessels each time and eventually creating the effect of a survey with 4 times the number of streamers. The end result was a seismic dataset with a larger range of wider azimuths, delivering a breakthrough in seismic imaging.

Another common acquisition pattern for 3D seismic marine surveys is the "racetrack" vessel pattern, wherein the survey has a single line orientation (or "survey azimuth"), and a long, narrow spread of streamers are towed by a single vessel. Typically, a vessel equipped with one or two airgun sources and towing 8-10 streamers travels in a straight line through the survey area. When it reaches the edges of the survey area, it continues in a straight line for one half the length of a streamer then turns in a wide arc to travel in a straight line back and parallel to the first run. With each subsequent run, the racetrack like course is displaced laterally from the last run, until the entire area has been covered.

Figure 4:
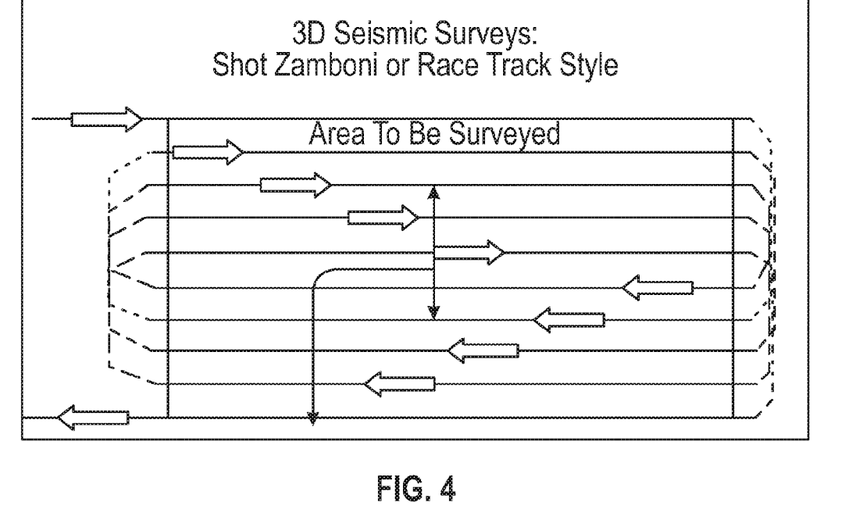
FIG. 4 displays the traditional racetrack pattern of acquiring marine 3D seismic data.
Figure 5A:
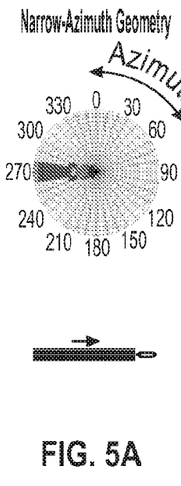
FIG. 5A Traditional Marine Survey.
Figure 5B:
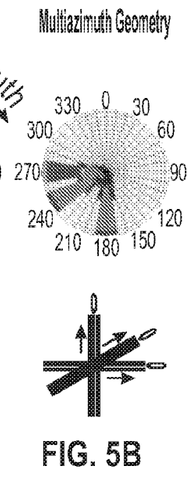
FIG. 5B Multi-Azimuth Survey acquired by one vessel.
Figure 5C:
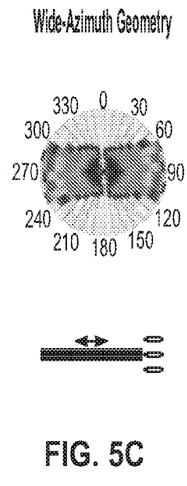
FIG. 5C Wide-Azimuth Survey acquired by several vessels.
Figure 5D:
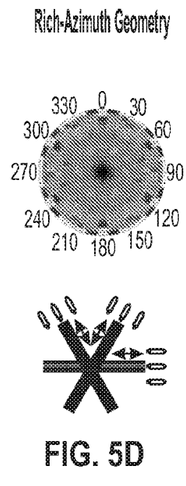
FIG. 5D, Rich-Azimuth Survey.
Figure 5E:
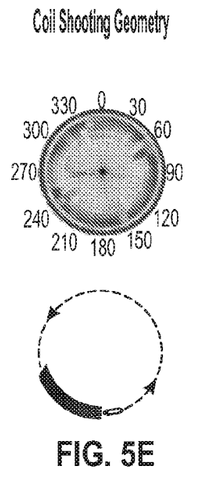
FIG. 5E, Coil Shooting single-vessel technique.

The racetrack pattern is shown FIG. 4, wherein the acquisition path follows a straight line (blue arrow) then turns 180° to acquire data in the opposite direction (orange arrow). No data are normally recorded during line turns (black) because the streamers do not maintain their lateral separation during turns and the position of the receivers cannot be accurately calculated. Further, there is known to be increased noise during turns due to dragging the streamer through the water somewhat sideways.

Recently, surveyors have developed a coil pattern, involving circles that gradually shift in the desired direction—a development made possible with Q-marine single sensor technology. See Biua (208). Compared to prior acquisition patterns, the coil pattern delivered a higher number of contributions (yellow and red) for a complete range of azimuths for all offsets. See FIG. 5. Further, with parallel geometries, vessels are productive about 45% of the time, but with a coiled geometry, they are productive about 90% of the acquisition time.

Figure 6:
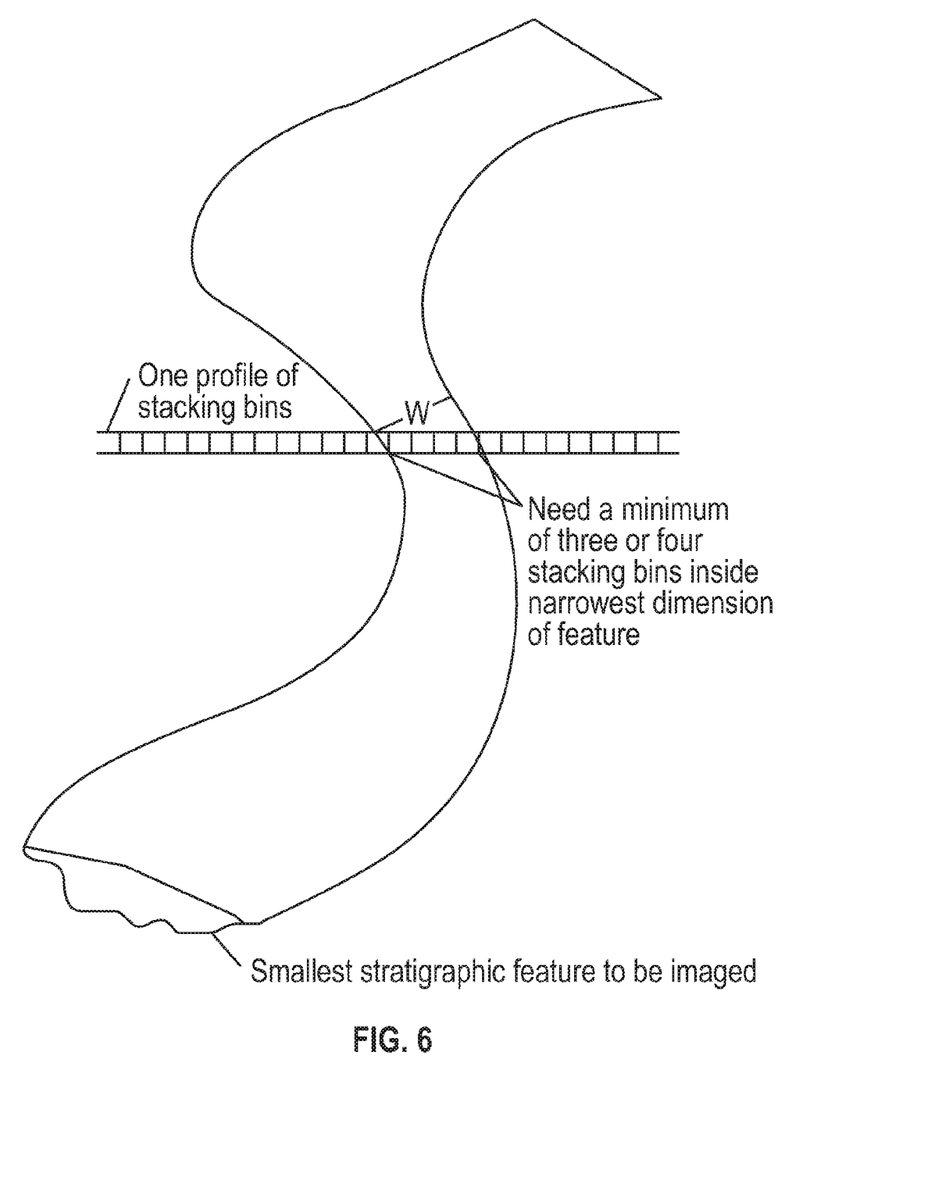
FIG. 6 shows bin spacing for optimal 3-4 bin coverage of the smallest feature to be mapped. Geophones are thus set to achieve this bin spacing.

During pre-processing, positional data gathered in the field is used to compute a theoretical grid network called a binning grid. Every individual recorded seismic trace is assigned to one or more bins; the number of traces summed together at each bin is called the fold or coverage for that bin. The nominal average fold for the survey is part of the descriptive information for the survey. Summing all the traces assigned to each bin creates a single multi-fold trace that is used as input to subsequent seismic processing steps. The general rule of thumb is that 3-4 bins are required to map the smallest (narrowest) horizontal dimension of a stratigraphic feature that must be seen in the 3D data volume. See e.g., FIG. 6. Thus, the geophones in a land-based survey are set at the optimal spacing to allow for 3-4 bin coverage of the smallest feature to be mapped.

However, in marine surveys, the normal approach is to select the bin grid size based upon the spacing of the sensors in the cables and the spacing of the streamers in the water. Since sensor spacing is fixed at the time of manufacture, most (if not all) marine seismic surveys are acquired at some multiple 12.5 meters (m). Thus, a common bin size is 6.25 m by 25 m or 12.5 m by 12.5 m. If geophysically one only needed a 16 m bin grid, the conventional approach would be to oversample at 12.5 m. However, this is expensive and wasteful, since these surveys can take months to perform. This conventional "racetrack" pattern generates a very uniform distribution of data over the project, but it is wasteful from a compressed seismic imaging approach as the survey acquires an excess of data that is unneeded.

Thus, what is needed in the art is a better method of establishing the bin grid pattern in marine 3D seismic surveys that optimizes data acquisition over the survey area, and doesn't needlessly cover or over-cover the geological features to be mapped.

SUMMARY OF THE DISCLOSURE

The present disclosure describes a better method of survey design that avoids or minimizes collecting unneeded data, and allows the vessel to sail with the wind or currents, instead of compensating for same to maintain straight lines for data collection.

The first step in implementing the disclosure is to select a trial bin grid of a geophysically determined size. Commonly, we determine this size by bin aliasing rules of the maximum frequency. Conventional surveys would then round to the next smaller standard bin size, but in this disclosure this is no longer necessary.

The next step is to use the geologic model for the project area and determine the stability of the Compressed Seismic Imaging (CSI) designs given the bin grid and geologic model. While all bin grids will result in a CSI design for a geologic model, some are not as stable, so it may be necessary to modify the bin size or orientation and re-determine the CSI design iteratively to locate a stable solution. This process of establishing the proper CSI design is addressed in U.S. Pat. No. 8,897,094 and US201108011354277, which are incorporated by reference in their entirety for all purposes.

The next step with the proper designs determined and the offset or similar attributes determined, is to establish a set of rules, which again will be unique to the region and the CSI algorithm applied. These rules would be the rules for acquisition and might be, for example, that in no region more than 3 bins can be missing two unique offset planes in a row or that no more than 15% of the unique offset planes can be void of traces. The rules would apply to the coverage and distributions of the seismic data that will be acquired in the next step and basically define what constitutes a fully acquired dataset. The rules we have used to date tend to relate to gaps in coverage and orientation and distribution of the trace data when compared from one bin to another bin in the survey and over an areal region.

The next step with the rules in hand is to acquire the seismic data. Because the rules don't require a conventional uniform grid of offsets and azimuths like a conventional survey, there is no particular requirement that the survey needs to be acquired in a conventional racetrack approach or other regular pattern approach. This also implies that unlike a conventional survey where it is customary to acquire the data in a uniform spacing, in the CSI design, the station spacing is normally not uniform.

There are a few patents like this US20130250720 (random source activation/spacing) and U.S. Pat. No. 8,681,581 (randomizing distribution of receivers and sources) & U.S. Pat. No. 8,711,654 (random survey locations) that address random style acquisition. CSI techniques are not random, however, and require that the shots be placed at the predetermined optimal positions. Simply put CSI approaches have an imaging algorithm and technique implicit to their design. Therefore there exists a single optimal solution for the particular CSI approach applied that will result in the best image. Many solutions will work but are all sub-optimally. Using a random approach, it is statistically unlikely to consistently come up with the optimal solution. Thus, the CSI design approach, while not uniform, is much better than these random approaches, which result in a sub-optimal solution.

In actuality, it is likely that the survey would be acquired as a series of cross-cutting passes of the vessel at different orientations due to shifting winds, currents, tides and the like. Again, since the surveyor is not required to shoot a racetrack or other regular pattern, there is no reason (unless the rules require it) that the vessel would not acquire the data into and out of the wind for ease of operation or e.g., with the current. This will be beneficial, because it will allow faster surveys and reduce noise, which is known be highest when shooting across currents.

If the winds change, the vessel would just move with the wind. No efforts need be made to avoid drift off a preset pathway, and instead, the actually pathway is tracked and compared against the desired rule set to ensure all rules are met. By continuing to shoot until the rules laid out above are met and all of the gaps are closed, the concept of infill is eliminated. The concept of fighting the currents and tides to generate a straight racetrack pattern is eliminated and the surveyor just acquires data without fighting Mother Nature. The conventional paradigm of marine seismic acquisition is thus obviated and the vessel meanders according to the wind and currents until the rules are met and full coverage is obtained.

The concept for this invention was developed while shooting in the arctic and dealing with icebergs, currents, winds and tides. Conventional approaches resulted in a great deal of standby time to find the exact right conditions where the icebergs were clear of the next transit path, while the winds and tides would not force the steamers into other icebergs. The solution was to acquire the data using the inventive method where one would acquire data in and out of the wind, tide and current direction and then dodge around the icebergs that could be drifting in many directions. Icebergs depending on their size can be moved by different currents at different depths so it is not uncommon for them to move in oblique directions if one is smaller than the rest. The inventive method allows near continuous acquisition by working around the obstacles and working with the winds and current instead of standing by waiting for better conditions.

The technical and economic advantage is that this method allows to design and process surveys that would optimal in terms of costs for the required geophysics at a significantly cheaper costs than conventional approaches, which over-sample and collect unneeded data.

As used herein, "design" refers to the precise source and receiver locations for the data acquired. These locations are determined in the CSI imaging step prior to data acquisition.

By "Compressed Seismic Imaging (CSI) design" herein we mean using the compressed sensing imaging concepts and apply them specifically to seismic layout, acquisition, and processing and all of the inherent limitations of seismic data collection like airgun recharge rates and towing issues etc.

By "stability" herein we refer to the overall mathematical consistency of a solution or process. A technique that demonstrates stability will converge on the same answer from many different starting points.

By "stable CSI design," what is meant is a CSI design that demonstrates stability, e.g., will converge on the same answer from multiple starting points.

By "allowing wind and current to direct travel" we mean intentionally allowing wind and current to direct vessel path at least a significant portion of sailing time, e.g. about 25%, 30%, 40% or so. Thus is to be distinguished from efforts to travel in a particular grid pattern, wherein the wind and current may occasionally direct travel, but the operator actively attempts to counteract this, keeping any drifting to a minimum such that a particular survey path, such as racetrack, can be obtained. Thus, accidental wind and current drift is not included under this understanding of the term.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

BRIEF DESCRIPTION OF THE DRAWINGS

Comparing coverage obtained with various acquisition geometries.

DETAILED DESCRIPTION

The disclosure provides novel methods of acquiring seismic data, which eliminates oversampling, infill and the need to fight wind and current to provide a straight line data.

Specifically, the methods herein described allow for the design and acquisition of marine seismic surveys using a rule-based mode without need for conventional designs that result in wasted coverage. This will decrease the cost of acquiring data because of the smaller sampling size and ease of determining when enough data has been collected and accelerate modeling times by decreasing the presence of unneeded data points.

The invention includes one or more of the following embodiments, in any combination thereof:

A method of acquiring marine 3D seismic data comprising acquiring 3D data of an area to be surveyed without compensating for wind and current, but instead allowing wind and current to direct travel, collecting data positioning data while acquiring 3D data, and continuing until said collected positioning data indicates that sufficient coverage of said area has been obtained.

A method of marine 3D seismic data acquisition, comprising: obtaining a marine geology model of a marine survey area; determining a bin size and orientation based on a smallest feature to be mapped and a shape of said marine geology model; determine a stability of a compressed Seismic Imaging (CSI) design and if unstable modify said source & receiver station spacing and location, bin size or orientation and re-determine said stability of said CSI design iteratively to locate a stable solution for said CSI design; establish a set of rules for coverage of said marine survey area that meet the CSI design; and acquiring 3D seismic data over said marine survey area until said rules are met, wherein wind and current are not compensated for but allowed to direct vessel travel and or streamer shape at least a portion of the time.

A method of imaging a marine 3D survey area, comprising: obtaining or developing a geology model of a marine survey area; determining a bin size and orientation based on a smallest feature to be mapped and a shape of said marine geology model; determining a stability of a compressed seismic imaging source and receiver station and sampling design ("CSI design"), and if unstable modify said bin size or orientation and re-determine said stability iteratively to produce a stable CSI design; establishing a set of sampling rules for coverage of said marine survey area to assure that appropriate data is recorded so said stable CSI design can be properly reconstructed; acquiring 3D seismic data traces over said marine survey area using said stable CSI design until said rules are met, wherein wind and current are not compensated for but allowed to direct vessel travel; reconstructing a wavefield and regularizing the traces using the appropriate reconstruction techniques to produce seismic data. In some method, the further steps of processing the seismic data and imaging the survey area are also included.

A method of acquiring marine 3D seismic data comprising: acquiring 3D seismic data of an marine area to be surveyed without compensating for wind and current, but instead allowing wind and current to direct >25% of said travel; collecting data positioning data while acquiring 3D data; and continuing said acquiring step until said collected positioning data indicates that sufficient coverage of said marine area has been obtained such that a seismic map of said marine area can be constructed from said 3D seismic data. The wind and current may direct most of vessel travel, e.g., >50% or >75%, even when shifting.

A method as herein described, wherein sufficient coverage is determined by the following steps: obtaining or developing a geology model of a marine survey area; determining a bin size and orientation based on a smallest feature to be mapped and a shape of said geology model; determining a stability of a CSI design and if unstable modify said bin size or orientation and re-determine said stability of said CSI design iteratively to locate a stable solution and produce a stable CSI design; establishing a set of sampling rules for coverage of said survey area to assure that appropriate data is recorded so the CSI design can be properly reconstructed; and acquiring 3D seismic data traces over said marine survey area using the stable CSI design until said rules are met, wherein wind and current are not compensated for but allowed to direct vessel travel; and reconstructing a wavefield and regularizing said traces using appropriate reconstruction techniques to produce seismic data.

A method as herein described, including the further step of processing the seismic data using conventional techniques and imaging said survey area.

A method as herein described, wherein said CSI design is determined by a method comprising: constructing an optimization model, via a computing processor, given by $\min_u \|Su\|_1$ s.t. $\|Ru-b\|_2 \leq \sigma$ wherein S is a discrete transform matrix, b is seismic data on an observed grid, u is seismic data on a reconstruction grid, and matrix R is a sampling operator; defining mutual coherence as:

$$\mu \leq \sqrt{\frac{C}{S}\frac{m}{(\log n)^6}},$$

wherein C is a constant, S is a cardinality of Su, m is proportional to number of seismic traces on the observed grid, and n is proportional to number of seismic traces on the reconstruction grid; deriving a mutual coherence proxy, wherein the mutual coherence proxy is a proxy for mutual coherence when S is over-complete and wherein the mutual coherence proxy is exactly the mutual coherence when S is a Fourier transform; and determining a sample grid according to $r^*=\arg\min_r \mu(r)$.

A method as herein described, wherein the sample grid is determined via randomized greedy algorithm method, and/or a randomized greedy algorithm method finds local minimum.

A method as herein described, wherein the sample grid is determined via a stochastic global optimization method.

A method as herein described, wherein $r^*=\arg\min_r \mu(r)$ is non-convex.

A method as herein described, wherein the mutual coherence proxy is derived using fast Fourier transform.

A method as herein described, wherein collected traces or data are analyzed in real time or near real time to confirm sufficient coverage and that said rules have been met.

A method as herein described, wherein an actual pathway travelled is mapped and used to thereby confirm sufficient coverage and that said rules have been met.

Any method described herein, including the further step of printing, displaying or saving the results of the method.

A printout or 3D display of the results of the method.

A non-transitory machine-readable storage medium containing or having saved thereto the seismic imaging results of the method.

Any method described herein, further including the step of using said results in a seismic modeling program to predict e.g., reservoir performance characteristics, such as fracturing, production rates, total production levels, rock failures, faults, wellbore failure, and the like.

Any method described herein, further including the step of using said results to design and implement a reservoir drilling, development, production or stimulation program.

A non-transitory machine-readable storage medium, which when executed by at least one processor of a computer, performs the steps of the method(s) described herein.

The present disclosure also relates to a computing apparatus for performing the operations herein. This apparatus may be specially constructed for the required purposes of modeling, or it may comprise a general-purpose computer selectively activated or reconfigured by a spreadsheet program and reservoir simulation computer program stored in the computer. Such computer programs may be stored in a computer readable storage medium, preferably non-transitory, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

In one embodiment, the computer system or apparatus may include graphical user interface (GUI) components such as a graphics display and a keyboard, which can include a pointing device (e.g., a mouse, trackball, or the like, not shown) to enable interactive operation. The GUI components may be used both to display data and processed data and to allow the user to select among options for implementing aspects of the method or for adding information about reservoir inputs or parameters to the computer programs. The computer system may store the results of the system and methods described above on disk storage, for later use and further interpretation and analysis. Additionally, the computer system may include on or more processors for running said spreadsheet and simulation programs.

Hardware for implementing the inventive methods may preferably include massively parallel and distributed Linux clusters, which utilize both CPU and GPU architectures. Alternatively, the hardware may use a LINUX OS, XML universal interface run with supercomputing facilities provided by Linux Networx, including the next-generation Clusterworx Advanced cluster management system.

Another system is the Microsoft Windows 7 Enterprise or Ultimate Edition (64-bit, SP1) with Dual quad-core or hex-core processor, 64 GB RAM memory with Fast rotational speed hard disk (10,000-15,000 rpm) or solid state drive (300 GB) with NVIDIA Quadro K5000 graphics card and multiple high resolution monitors.

Slower systems could also be used, but are not preferred because the method is already compute intensive.

The term "many-core" as used herein denotes a computer architectural design whose cores include CPUs and GPUs. Generally, the term "cores" has been applied to measure how many CPUs are on a giving computer chip. However, graphic cores are now being used to offset the work of CPUs. Essentially, many-core processors use both computer and graphic processing units as cores.

Marine Survey Equipment

Figure 1B:
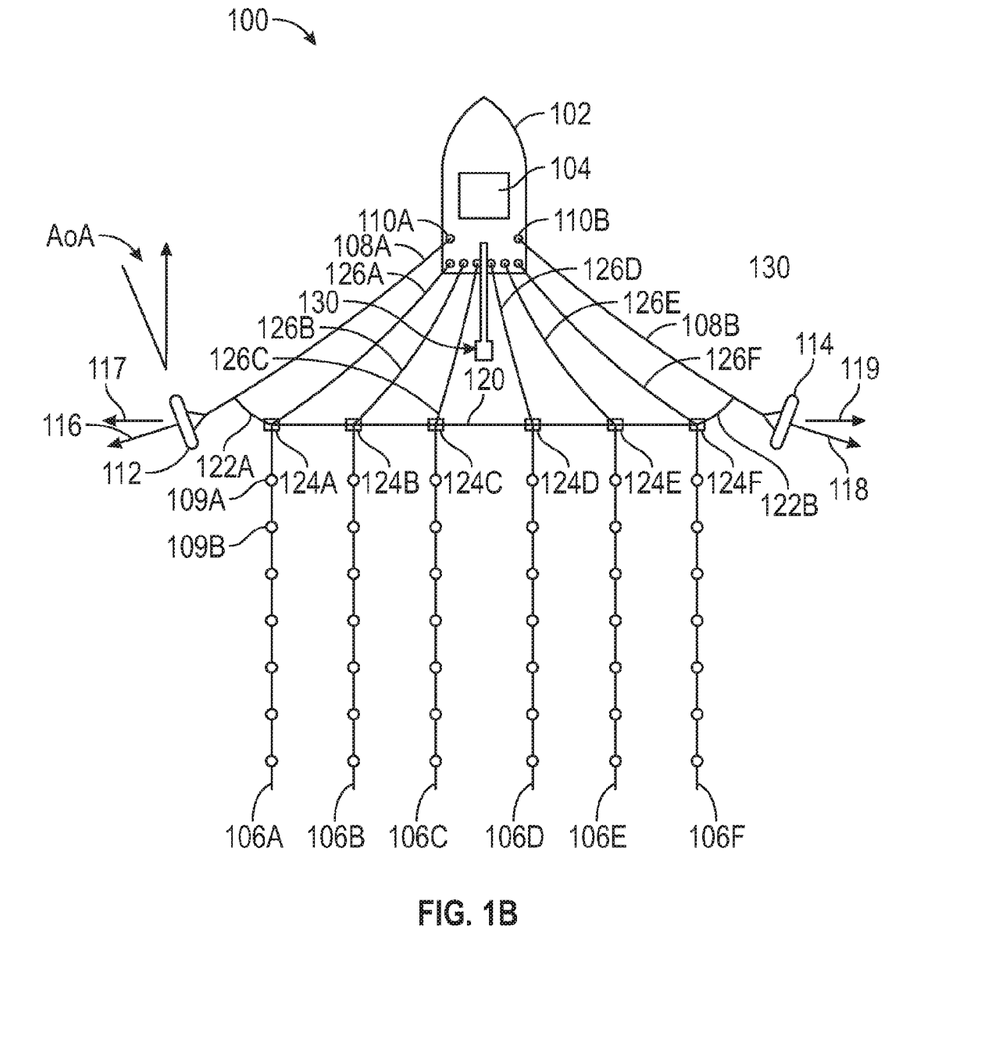
FIG. 1B is a top view of a typical seismic vessel and streamers.

FIG. 1B shows an overhead view of a marine survey system 100 in accordance with at least some embodiments of the invention, wherein paravanes are used to control streamer positioning. In particular, FIG. 1B shows a survey vessel 102 having onboard equipment 104, such as navigation, energy source control, and data recording equipment. Survey vessel 102 is configured to tow one or more sensor streamers 106A-F through the water and one or more sources 130 (one shown here). While FIG. 1 illustratively shows six streamers 106, any number of streamers 106 may be equivalently used. In other surveys, ocean bottom cables (OBC) or ocean bottom nodes (OBN, cable free receivers) are used instead, thus obviating many towed streamer issues.

The streamers 106 are coupled to towing equipment that maintains the streamers 106 at selected lateral positions with respect to each other and with respect to the survey vessel 102. The towing equipment may comprise two paravane tow lines 108A and 108B each coupled to the vessel 102 by way of winches 110A and 110B, respectively. The winches enable changing the deployed length of each paravane tow lines 108. The second end paravane tow line 108A is coupled to a paravane 112, and the second end of paravane tow line 108B is coupled to paravane 114. In each case, the tow lines 108A and 108B couple to their respective paravanes through respective sets of lines called a "bridle".

The paravanes 112 and 114 are each configured to provide a lateral force (transverse to the direction of motion) component to the various elements of the survey system when the paravanes are towed in the water, as will be explained below. The lateral force component of paravane 112 is opposed to that of paravane 114. For example, paravane 112 may create a force as illustrated by arrow 116, and the lateral component of force 116 is shown by arrow 117. Likewise, paravane 114 may create a force as illustrated by arrow 118, and the lateral component of force 118 is shown by arrow 119. The combined lateral forces of the paravanes 112 and 114 separate the paravanes from each other until they put one or more spreader lines 120, coupled between the paravanes 112 and 114, into tension. The paravanes 112 and 114 either couple directly to the spreader line 120, or as illustrated couple to the spreader line by way of spur lines 122A and 122B.

The streamers 106 are each coupled, at the ends nearest the vessel 102 to a respective lead-in cable termination 124A-F. The lead-in cable terminations 124 are coupled to or are associated with the spreader lines 120 so as to control the lateral positions of the streamers 106 with respect to each other and with respect to the vessel 102. It should be noted that the spacings between 106 can be uniform or non-uniform depending on the CSI implementation chosen. Electrical and/or optical connections between the appropriate components in the recording system 104 and the sensors (e.g., 109A, 109B) in the streamers 106 may be made using inner lead-in cables 126A-F. Much like the tow lines 108 associated with respective winches 110, each of the lead-in cables 126 may be deployed by a respective winch or similar spooling device such that the deployed length of each lead-in cable 126 can be changed.

During periods of time when the survey vessel 102 is traveling in an approximately straight line, the speed of the paravanes 112 and 114 through the water is approximately the same, and thus the lateral force created by similarly configured paravane 112 and 114 may be approximately the same. However, when the survey vessel 102 executes a turn (e.g., a 180 degree turn to align the vessel for the next pass over the survey area), the paravane on the outside of the turn tends to move faster through the water than the paravane on the inside of the turn, the providing greater lateral force than paravane 112. The paravanes also compensate somewhat for water currents.

The paravanes 112 and 114 can have adjustable lateral force, such that the tension on the spreader lines 120 can be controlled. The paravanes 112 and 114 according at least some embodiments comprise systems to controllably redirect the flow of water past the paravane, and/or adjust the angle of attack to control the amount of lateral force developed. Angle of attack for purposes of this disclosure and claims shall be a relationship between the direction of motion of the tow vessel 102 and a long dimension of one or more frames (described below) of the paravane.

FIG. 1B shows the angle of attack (AoA) for the illustrative situation of FIG. 1. Such control may be helpful in a variety of situations, such as during turns.

Compressive Sensing

A common goal of the engineering field of signal processing is to reconstruct a signal from a series of sampling measurements. In general, this task seems impossible because there is no way to reconstruct a signal during the times that the signal is not measured. Nevertheless, with prior knowledge or assumptions about the signal, it turns out to be possible to perfectly reconstruct a signal from a series of measurements. Over time, engineers have improved their understanding of which assumptions are practical and how they can be generalized.

An early breakthrough in signal processing was the Nyquist-Shannon sampling theorem. It states that if the signal's highest frequency is less than half of the sampling rate, then the signal can be reconstructed perfectly. The main idea is that with prior knowledge about constraints on the signal's frequencies, fewer samples are needed to reconstruct the signal.

Around 2004, Emmanuel Candés, Terence Tao, and David Donoho proved that given knowledge about a signal's sparsity, the signal may be reconstructed with even fewer samples than the sampling theorem requires. This idea is the basis of compressed sensing. Compressive sensing is described in further detail in 61/898,960 filed Nov. 1, 2013, and US20150124560, each incorporated by reference herein in its entirety for all purposes. See also U.S. Pat. No. 8,681,581 and US20130250720. A short summary is presented herein, and the reader is referred to the above cases for additional detail.

Compressed sensing is a signal processing technique for efficiently acquiring and reconstructing a signal, by finding solutions to underdetermined linear systems. This is based on the principle that, through optimization, the sparsity of a signal can be exploited to recover it from far fewer samples than required by the Shannon-Nyquist sampling theorem. There are two conditions under which recovery is possible. The first one is sparsity, which requires the signal to be sparse in some domain. The second one is incoherence which is applied through the isometric property which is sufficient for sparse signals.

Two classes of optimization models, synthesis- and analysis-based optimization models, are considered. For the analysis-based optimization model, a novel optimization algorithm (SeisADM) is presented. SeisADM adapts the alternating direction method with a variable-splitting technique, taking advantage of the structure intrinsic to the seismic data reconstruction problem to help give an efficient and robust algorithm. SeisADM is demonstrated to solve a seismic data reconstruction problem for both synthetic and real data examples. In both cases, the SeisADM results are compared to those obtained from using a synthesis based optimization model. Spectral Projected Gradient L1 solver (SPGL1) method can be used to compute the synthesis-based results.

Through both examples, it is observed that data reconstruction results based on the analysis-based optimization model are generally more accurate than the results based on the synthesis-based optimization model. In addition, for seismic data reconstruction, the SeisADM method requires less computation time than the SPGL1 method.

Compressive sensing can be successfully applied to seismic data reconstruction to provide a powerful tool that reduces the acquisition cost, and allows for the exploration of new seismic acquisition designs, such as that described herein. Most seismic data reconstruction methods require a predefined nominal grid for reconstruction, and the seismic survey must contain observations that fall on the corresponding nominal grid points. However, the optimal nominal grid depends on many factors, such as bandwidth of the seismic data, geology of the survey area, and noise level of the acquired data. It is understandably difficult to design an optimal nominal grid when insufficient information is available. In addition, it may be that the acquired data contain positioning errors with respect to the planned nominal grid. An interpolated compressive sensing method is thus presented, which is capable of reconstructing the observed data on an irregular grid to any specified nominal grid, provided that the principles of compressive sensing are satisfied. The interpolated compressive sensing method provides an improved data reconstruction compared to results obtained from some conventional compressive sensing methods.

Compressive sensing is utilized for seismic data reconstruction and acquisition design. Compressive sensing theory provides conditions for when seismic data reconstruction can be expected to be successful. Namely, that the cardinality of reconstructed data is small under some, possibly over-complete, dictionary; that the number of observed traces are sufficient; and that the locations of the observed traces relative to that of the reconstructed traces (i.e. the sampling grid) are suitably chosen. If the number of observed traces and the choice of dictionary are fixed, then choosing an optimal sampling grid increases the chance of a successful data reconstruction.

To that end, a mutual coherence proxy is considered which is used to measure how optimal a sampling grid is. In general, the computation of mutual coherence is prohibitively expensive, but one can take advantage of the characteristics of the seismic data reconstruction problem so that it is computed efficiently. The derived result is exact when the dictionary is the discrete Fourier transform matrix, but otherwise the result is a proxy for mutual coherence. The mutual coherence proxy in a randomized greedy optimization algorithm is used to find an optimal sampling grid, and show results that validate the use of the proxy using both synthetic and real data examples.

One example of a computer-implemented method for determining optimal sampling grid during seismic data reconstruction includes: a) constructing an optimization model, via a computing processor, given by:

$$\min_u \|Su\|_1 \, s.t. \, \|Ru-b\|_2 \leq \sigma$$

wherein S is a discrete transform matrix, b is seismic data on an observed grid, u is seismic data on a reconstruction grid, and matrix R is a sampling operator; b) defining mutual coherence:

$$\mu \leq \sqrt{\frac{C}{S} \frac{m}{(\log n)^6}}$$

wherein C is a constant, S is a cardinality of Su, m is proportional to number of seismic traces on the observed grid, and n is proportional to number of seismic traces on the reconstruction grid; c) deriving a mutual coherence proxy, wherein the mutual coherence proxy is a proxy for mutual coherence when S is over-complete and wherein the mutual coherence proxy is exactly the mutual coherence when S is a Fourier transform; and d) determining a sample grid:

$$r^* = \arg\min_r \mu(r)$$

In some embodiments, the sample grid is determined via randomized greedy algorithm method, and the randomized greedy algorithm method finds local minimum. In others, the sample grid is determined via stochastic global optimization method. In still other embodiments, $r^* = \arg\min_r \mu(r)$ is non-convex. In yet others, the mutual coherence proxy is derived using fast Fourier transform.

Data Acquisition Method

In rule-based modeling, a set of rules is used to indirectly specify a mathematical model. The rule-set can either be translated into a model such as Markov chains or differential equations, or be treated using tools that directly work on the rule-set in place of a translated model, as the latter is typically much bigger. Rule-based modeling is especially effective in cases where the rule-set is significantly simpler than the model it implies, meaning that the model is a repeated manifestation of a limited number of patterns.

The present method establishes an independent bin grid of some geophysically selected size that is used to determine the needed locations of the source and receivers to properly populate the area to obtain an accurate image of the data. Once the locations are determined, specific project rules for the seismic acquisitions can be developed and applied in the field to determine if additional data needs to be acquired. Thus, only the needed data is acquired, and expense is saved in avoiding over-acquiring excess data.

The first step to implementing the method is to select a trial bin grid of a geophysically determined size. Bin grids are created during seismic trace processing by calculating the theoretical common mid point (usually called CMP) locations for each shot—receiver pair and then summing the traces together based on a mathematical gridding algorithm. Thus, the size of the bin grid is based upon the spacing of the sensors in the cables and the spacing of the streamers in the water. When the bin grid size matches the area of interest, then an appropriate amount of sampling is obtained. However, for larger or smaller areas, oversamples occurs resulting in the accumulation of unnecessary data points the slow down processing and analysis of the seismic data.

The geologic model for the selected trial bin grid is used to estimate the stability of a Compressed Seismic Imaging (CSI) design. Using prior knowledge of the likely geology in the targeted region an overall geologic model is constructed. Using the sampling spacings or station layouts is then tested against the proposed CSI design to test the stability of the solution. This process is effectively repeated for all possible CSI approaches for the particular design and then the best sampling is selected that results in the maximum mutual incoherence.

Once the proper design and their offsets are determined, rules can be developed. The set of rules will be unique to the chosen region and to the CSI algorithm that is applied, but in effect are a measure of how badly can the data be sampled and still properly reconstruct the correct wavefield and image. These rules mainly cover the rules for acquisition of data, such as no region greater than 3 bins can be missing two unique offset planes in a row. Other rules relating to gaps in coverage or orientation of the shot/receivers and/or distribution of the trace data can also be developed. These rules are necessary to make sure that the minimum required data to properly reconstruct the wavefield using CSI techniques are collected in the field. The normal approach for creation of the rules is to take the perfectly acquired CSI design and then start decimating various attributes like sampling until the final image degrades. In the chosen example of 3 bins in a row missing 2 unique offset planes, depending on the CSI design, if 3 unique offset planes in a row are missing data then the solution is degraded and an artifact in the final process image is created. This creates a rule that when acquiring the data must be met or acquisitions continue until it is met and the survey is completed.

Unlike a conventional marine survey, the rules-based method does not require a uniform grid of offsets and azimuths. Thus, the survey can be collected using whichever pattern is quickest, cheapest, and most reliable. Series or cross-cutting passes of the vessel at different orientations due to winds and tides are expected to be the best pattern for collecting data.

If winds change, the surveying ship can simply move with the wind instead of trying to maintain a set pattern such as the racetrack approach. Thus, time and money can be saved by utilizing nature to collect data instead of fighting currents and tides to adhere to a rigid collection pattern. In effect, although the ship may attempt to collect the data is some predetermined pattern, it need not stick to that pattern as wind and current change are not problematic, thus, a degree of meandering can be tolerated, and even a high degree of what appears to be meandering. However, from the viewpoint of the data acquisition, the operator will not be meandering but simply driving where needed to cover the field, and not fighting wind and currents to do so.

By continuing to shoot until the rules are met, the resulting survey will have no gaps and no infill, or at least un-needed infill will be substantially reduced. This will aid in reducing modeling time and cost. On the other hand, there may be areas where there is a surplus of data acquired because of the way the tides and winds worked out. These oversampled areas are a byproduct of not standing by for weather and winds and follow the goal of excess data is better than no data and paying to wait on weather.

In order to know that sufficient coverage has been obtained to meet the rules, the data will either be analyzed in real time or near real time, or one can track the actual pathway travelled, and thereby confirm sufficient coverage.

A variety of commercially available acquisition and tracking programs can be used herein. See e.g., the Omni 3D Design package, NORSAR-3D modeling package, the Nucleus software package, Globe claritas, Delph, Seismix, and the like.

While the invention is described above in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The following references are incorporated by reference in their entirety.

Buia M. et al., Shooting Seismic Surveys in Circles, Oilfield Review, Autumn 2008:18-31.

Wang Y., Recovery of Seismic Wavefields Based on Compressive Sensing by an l1-Norm Constrained Trust Region Method and the Piecewise Random Sub-sampling Geophys. J. Int. (2010) 000, 1-19.

61/898,960, filed Nov. 1, 2013, and US20150124560 Compressive sensing

US20100265799 Compressive sensing system and method for bearing estimation of sparse sources in the angle domain U.S. Pat. No. 8,681,581 Randomization of data acquisition in marine seismic and electromagnetic acquisition US20130250720 Method for acquiring marine seismic data U.S. Pat. No. 8,711,654 Random sampling for geophysical acquisitions U.S. Pat. No. 8,897,094 L Marine seismic data acquisition using designed non-uniform streamer spacing

US201108011354277

WO2012166737 Two-way wave equation targeted data selection for seismic acquisition of complex geologic structures US2012300585 Reciprocal method two way wave equation targeted data selection for seismic acquisition of complex geologic structures US20120014212 Continuous composite relatively adjusted pulse U.S. Pat. No. 5,079,703 3-dimensional migration of irregular grids of 2-dimensional seismic data

What is claimed is:

1. A method of marine survey area imaging, the method comprising:
    developing a geology model of a marine survey area for a sample grid of a geophysically selected size;
    generating a compressed seismic imaging design ("CSI design") by iteratively modifying the sample grid until the CSI design is stable;
    determining a set of sampling rules for the marine survey area and the CSI design, the set of rules providing coverage of the marine survey area such that minimum data is recorded for wavefield reconstruction using the CSI design;
    acquiring 3D seismic data traces as a series of cross-cutting passes of a vessel at one or more orientations over the marine survey area using the CSI design until the set of sampling rules is met;
    producing seismic data by reconstructing a wavefield and regularizing the 3D seismic data traces; and
    identifying where at least one of oil or gas may be trapped in sufficient quantities for exploration activities using the seismic data.

2. The method of claim 1, wherein the sample grid is determined by:
    constructing an optimization model given by $\min_u \|Su\|_1 \text{ s.t.} \|Ru-b\|_2 \leq \sigma$, wherein Su is a discrete transform matrix, b is seismic data on an observed grid, u is seismic data on a reconstruction grid, and matrix R is a sampling operator;
    defining a mutual coherence as:

$$\mu \leq \sqrt{\frac{C}{S}\frac{m}{(\log n)^6}},$$

wherein C is a constant, S is a cardinality of Su, m is proportional to a number of seismic traces on the observed grid, and n is proportional to a number of seismic traces on the reconstruction grid;
    deriving a mutual coherence proxy, wherein the mutual coherence proxy is a proxy for the mutual coherence when S is over-complete and wherein the mutual coherence proxy is exactly the mutual coherence when S is a Fourier transform; and
    determining the sample grid according to $r^* = \arg \min_r \mu(r)$.

3. The method of claim 2, wherein $r^* = \arg \min_r \mu(r)$ is non-convex.

4. The method of claim 2, wherein the mutual coherence proxy is derived using a fast Fourier transform.

5. The method of claim 1, wherein the sample grid is determined via a randomized greedy algorithm method.

6. The method of claim 5, wherein the randomized greedy algorithm method finds local minimum.

7. The method of claim 1, wherein the sample grid is determined via a stochastic global optimization method.

8. The method of claim 1, wherein the 3D seismic data traces are analyzed during acquisition to confirm coverage of the marine survey area using the set of sampling rules.

9. The method of claim 8, wherein an actual pathway travelled by the vessel is used to confirm the coverage.

10. The method of claim 1, wherein the set of sampling rules is determined by decimating one or more attributes of the CSI design until a final image degrades.

11. The method of claim 1, wherein a map of a subsurface formation of the marine survey area where the at least one of oil or gas may be trapped is mapped by processing the seismic data.

12. The method of claim 1, wherein a stability of the CSI design is determined based on a mutual coherence of the sample grid.

* * * * *